Aug. 11, 1953  S. W. ALDERFER  2,648,619
FABRIC COATED SPONGE RUBBER AND METHOD OF MAKING SAME
Filed May 1, 1952
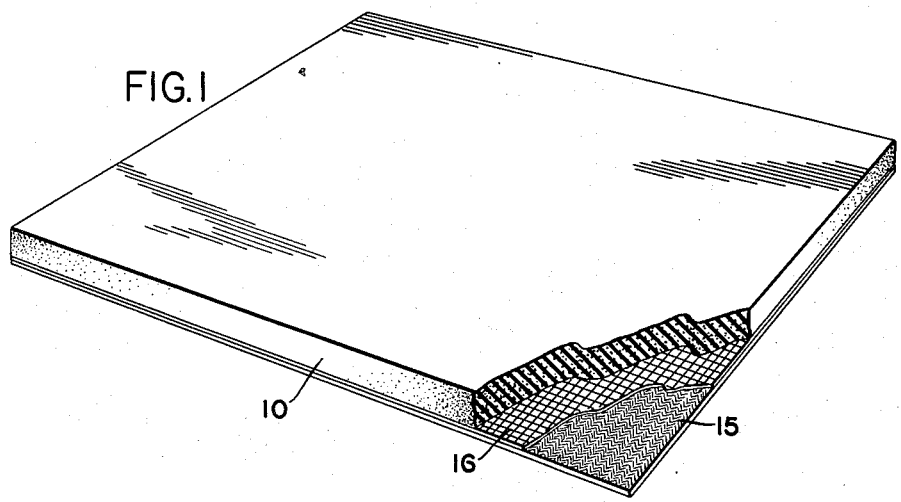
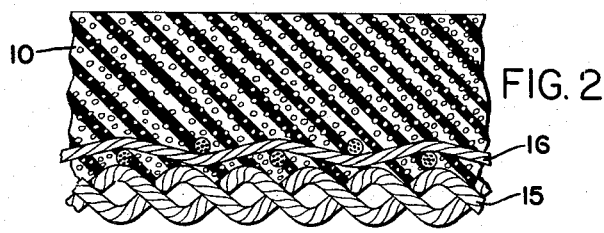
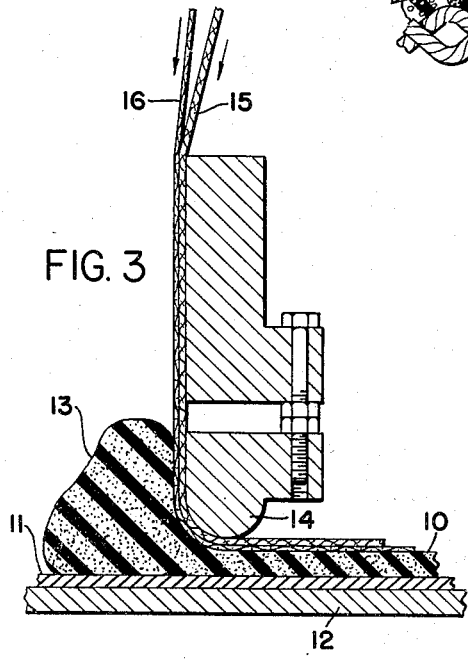
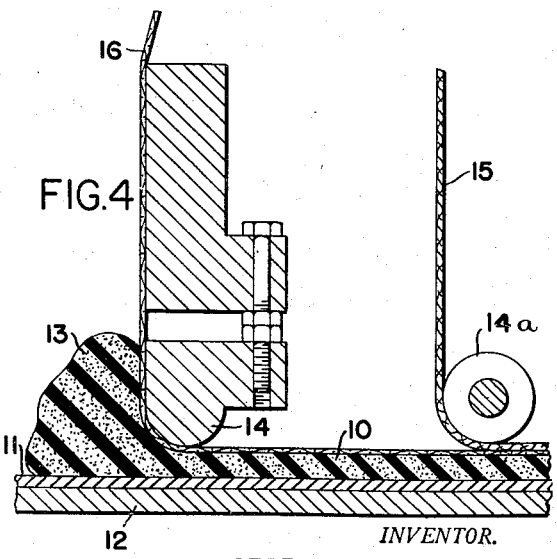
INVENTOR.
STERLING W. ALDERFER
BY
ATTORNEYS Patented Aug. 11, 1953 2,648,619

UNITED STATES PATENT OFFICE 2,648,619

FABRIC COATED SPONGE RUBBER AND METHOD OF MAKING SAME

Sterling W. Alderfer, Akron, Ohio, assignor of three-tenths to Edward D. Andrews, Akron, Ohio Application May 1, 1952, Serial No. 285,513

9 Claims. (Cl. 154—100)

This invention relates generally to a sponge rubber product having a fabric backing, and more particularly to a novel sponge rubber product having a non-elastic fabric backing provided with an outer surface of elastic fabric, and the method of making said product. Certain prior fabric-backed sponge rubber products consist of a layer of fabric adhered to a layer of sponge rubber by a layer of adhesive. Such products not only require a separate operation for applying the adhesive, but also are impervious to air because the adhesive closes up the pores of the sponge rubber so that the product cannot "breathe" or allow ventilation therethrough, and are therefore unsuitable for many purposes as in the manufacture of seat covers, mattress covers, carpet and rug linings, insole linings, etc.

Certain other fabric-backed sponge rubber products have consisted of a layer of sponge rubber which is adhered directly to a layer of fabric by spreading a mass of sponge rubber or latex foam over the top of the fabric, leveling the mass with a scraper or roller, allowing it to gel and then vulcanizing. Such products are pervious to air but have the disadvantage that the foam rubber surface is rough and pock marked due to the bursting at the surface of bubbles of air or gas during the gelling process.

In my copending application Serial No. 156,201, filed April 15, 1950, I have disclosed a novel fabric-backed sponge rubber product which overcomes these disadvantages in that it is pervious to air and can breathe properly because the rubber latex is attached directly to one surface of the fabric by penetration of the latex into the mesh of the fabric, and at the same time the outer surface of the foam rubber is smooth, planished and porous having uniformly distributed microscopic pores. The method of making that novel product is fully disclosed in my copending application Serial No. 156,203, filed April 15, 1950.

Many uses for fabric-backed foam rubber products require that the fabric be a knitted textile fabric, rather than woven, to increase the softness and enhance the appearance of the fabric side of the product. For example, for automobile seat coverings foam rubber backed with finely knitted fabric presents a softer texture and a more pleasing appearance than can be obtained with a woven textile fabric. Also, foam rubber backed with knitted textile fabric such as tricot is desired in making certain products such as brassières, because of the soft sheen and delicate appearance of the fabric.

A foam rubber product having such a fabric backing, even though made according to my copending applications Serial Nos. 156,201 and 156,-203 so as to be air-pervious and have a smooth rubber surface, still has the serious disadvantage that the knitted fabric backing is inherently very elastic and allows stretching of the fabric in all directions. This makes it undesirable for several reasons; e. g., the sheet cannot be laid on a table and cut to exact dimensions because of the distortion of the fabric as it is drawn through a clicking machine, and it cannot be satisfactorily used to upholster a chair seat or other furniture or for covering flat surfaces such as mats, because it distorts and stretches out of shape.

The object of the present invention is to provide a novel sponge rubber product and a method of making the same, said product having a knitted textile fabric backing which has all the desirable characteristics of the product of said application Serial No. 156,201, and at the same time is substantially non-elastic in all directions along its fabric side. In other words, the product of the present invention has a vulcanized layer of porous foamed rubber latex directly attached to a soft knitted fabric by penetration of the latex into the fabric, the outer surface of the foamed layer being soft, smooth and planished and having uniformly distributed microscopic pores, and the fabric side of the product being substantially non-elastic in all directions.

The drawing forming part hereof shows a piece of the finished product comprising the present invention, and also shows schematically a step in the method by which the product having all of the desirable characteristics may be made, but it will be understood that modifications may be made in the product and method which are within the scope of the appended claims.

Fig. 1 is a perspective view of a portion of a sheet of the finished product, parts of the layers thereof being broken away to show the composite construction;

Fig. 2 is an enlarged fragmentary cross section thereof, in which a schematic representation of the microscopic pores or air cells of the sponge rubber is attempted, although the size of the pores necessarily has been exaggerated;

Fig. 3 is a schematic sectional view showing a step in the method of assembling the foamed latex rubber with the fabric layers in making the novel product; and Fig. 4 is a similar view showing a modification of said method step.

The product of this invention consists of a layer of sponge rubber with an outer backing layer of knitted textile fabric and an intermediate layer of a square mesh woven fabric which is substantially non-elastic in all directions. The sponge rubber layer 10 is preferably made by foaming and beating rubber latex with a relatively large volume of air to produce a uniformly aerated mass of latex foam. The volume of air may be from four to seven times the volume of latex. Various types of beaters may be used for performing this operation, it being essential that the air and latex are so thoroughly mixed that a multiplicity of fine bubbles or pockets are formed, uniformly distributed throughout the latex. A suitable beating apparatus is shown in my copending application Serial No. 156,202, filed April 15, 1950. The latex is compounded with gelling and vulcanizing agents and pigments, usually during the beating operation.

From the beating apparatus, the freshly foamed latex is poured or spread upon a smooth surface to the depth required which may vary according to the requirements of a variety of products, as for example from a depth of one-sixteenth to one-quarter of an inch or more. The smooth supporting surface upon which the foamed latex is spread is preferably a moving continuous belt of leather, rubber or stainless steel which is kept polished and entirely free of dirt or traces of old latex. Such a belt is indicated at 11 in Figs. 3 and 4, supported on a suitable bed 12 traveling in the direction of the arrow, and a mass of freshly foamed latex as poured from the beating apparatus is indicated at 13.

As in my prior copending application Serial No. 156,203, the fabric backing is applied to the upper surface of the foamed layer supported on the belt 11, and is preferably applied to the rubber foam at the point where the foam is reduced and maintained at a required depth by a doctor roll or doctor bar 14 spaced above the belt 11, the foamed latex massing up in front of the doctor bar and moving through the pass between the doctor bar and the belt at the required depth. As shown in Fig. 3, the knitted fabric 15 which is to form the outer surface of the backing may be brought under the doctor bar as a continuous strip, and at this point a continuous strip of non-elastic open mesh woven fabric 16 is brought under the doctor bar below and in contact with the knitted fabric so that the open mesh fabric is in direct contact with the top surface of the reduced layer 10 of foamed latex. The representation of the fabric layers 15 and 16 in the drawings is merely an attempt to show schematically a contrast between the knitted fabric layer 15 and the woven fabric layer 16.

As the mass of latex contacts the open mesh fabric 16 a slight amount of the water in the latex may be absorbed in the interstices of the fabric strands carrying with it some of the foamed latex and causing the latex layer to become anchored to the open mesh fabric. As illustrated in Fig. 2, the bulk of the foamed latex will pass or "strike" through the open meshes into contact with the inner surface of the knitted fabric layer 15 which also absorbs some of the water in the latex to cause the latex to firmly embed itself in the interstices of the knitted fabric and become securely anchored to the fabric layer 15. In the case of most knitted fabrics, the latex does not carry through to the exposed side of the outer fabric layer but penetrates only sufficiently to knit firmly with the fabric. However, with knitted fabrics in which the latex tends to penetrate or strike through the fabric to its outer surface, the modified method of Fig. 4 is used. In such case, the woven open mesh fabric is brought alone under and in contact with the doctor bar 14 as shown, so that the latex 13 strikes through and substantially covers the upper side of the fabric as it leaves the doctor bar. A second doctor bar represented by roll 14a is positioned a slight distance beyond the bar 14, and the knitted fabric strip 15 is brought under the roll 14a into contact with the upper surface of the latex covered fabric, the height of roll 14a being adjustable to exert a slight downward pressure on the strip 15, sufficient to cause only a slight penetration of the latex into the interstices of the knitted fabric, and thus prevent any possibility of the latex striking through to the upper surface of the knitted fabric. Thus while the hydrostatic pressure built up by the latex mass 13 may cause excessive penetration, by bringing the knitted fabric in under the second doctor roll 14a, the penetration of the latex into the knitted fabric 15 is accurately controlled.

The open mesh fabric layer may be varied considerably, both as to the kind of material and as to the size of the mesh opening. It is preferably a square mesh material which may be woven tobacco cloth or cheese cloth, or may be woven of rayon or nylon yarn depending on the strength required. The size of the mesh opening is preferably at least four or five times the diameter of the yarn used. For a fabric-backed foam rubber sheet to be used as automobile seat covering material, I have found that a square mesh fabric woven from rayon marquisette and having a mesh opening about 1 millimeter square is a very satisfactory reinforcement for an outer finely knitted soft fabric layer having the desired soft feel and pleasing appearance. Somewhat greater strength can be attained by using a nylon yarn. For brassière material having an outer fabric layer 15 of knitted tricot, the intermediate layer 16 may be of tobacco cloth and still provide sufficient reinforcement for the outer layer. The depth of the foamed latex layer 10 also may vary considerably according to requirements. For most uses, this depth may range from $\frac{1}{16}''$ to $\frac{1}{4}''$, but for specific purposes it may be somewhat thinner or substantially thicker.

According to the preferred method of making the novel product, from the doctor bar 14 or 14a the belt 11 moves the composite sheet of foamed latex with the superimposed fabric layers 16 and 15 through a heated oven to set or gel the foamed latex under the influence of the setting agent, thus preserving the fine cellular structure of the latex. After the foam is set, the composite sheet leaves the belt and is passed through a vulcanizing chamber where the fabric may be held from shrinking by the use of well known tentering frames or belts. This method of making the product is not a part of this invention but is disclosed and claimed in my copending application Serial No. 156,203, filed April 15, 1950.

By causing the foamed rubber latex to set while it is in contact with the smooth surface of the belt or its equivalent, the outer surface of the finished sponge rubber layer 10 is given the smooth, velvety surface characteristic of the product of the invention disclosed in my copending application Serial No. 156,201, and by causing some of the foamed latex to strike through the intermediate reinforcing fabric layer and penetrate into the outer fabric layer, secure adhesion between the sponge rubber and the fabric backing is obtained without impairing the permeability of air through the entire composite sheet. The non-elastic intermediate layer is anchored to the outer knitted fabric layer by the sponge rubber layer and reinforces the outer layer, so that the composite fabric backing is rendered substantially non-elastic in all directions while presenting the desired soft texture and pleasing appearance on its outer surface.

Thus the product of this invention consists of a sponge rubber product backed with knitted textile fabric having a soft texture and attractive appearance but being substantially non-elastic, the composite product being thoroughly air-pervious and being smooth and velvety on the exposed side of the sponge rubber.

The terms "sponge rubber" and "foamed latex" used herein are words of description and not words of limitation and are intended to embrace any equivalent material having similar properties. Likewise "woven fabric" and "knitted fabric" are intended to cover, respectively, any woven fabric and any knitted textile fabric suitable for the purposes herein set forth.

The invention embodies such modifications and variations as are within the scope of the appended claims.

What is claimed is:

1. A new article of manufacture comprising a vulcanized layer of foamed and gelled rubber latex having a multitude of minute air cells distributed throughout the layer and communicating with each other, an intermediate layer of non-elastic open mesh woven textile fabric attached to one surface of said latex layer by penetration of the latex into the interstices of the fabric, and an outer layer of knitted textile fabric attached to said woven textile fabric and to said latex layer by penetration of the latex through the open mesh of said woven fabric and into the interstices of said knitted textile fabric, the outer surface of said latex layer being planished and characterized by the presence of substantially uniformly distributed microscopic pores.

2. A new article of manufacture comprising a vulcanized layer of foamed and gelled rubber latex having a vulcanized bond with a composite fabric backing, said latex layer having a multitude of minute air cells uniformly distributed throughout and a soft, smooth outer surface characterized by the presence of substantially uniformly distributed microscopic pores, said fabric backing consisting of an intermediate layer of non-elastic open mesh woven fabric attached to the other surface of said latex layer and an outer layer of knitted textile fabric attached to the other surface of said latex layer by penetration of the latex through the open mesh woven fabric and into the knitted fabric.

3. A new article of manufacture comprising a vulcanized layer of foamed and gelled rubber latex having a multitude of minute air cells distributed throughout the layer and communicating with each other, an intermediate layer of non-elastic open mesh woven textile fabric attached to one surface of said latex layer by penetration of the latex into the interstices of the fabric, and an outer layer of knitted textile fabric attached to said woven textile fabric and to said latex layer by penetration of the latex through the open mesh of said woven fabric and into the interstices of said knitted textile fabric.

4. A new article of manufacture comprising a vulcanized layer of foamed and gelled rubber latex having a vulcanized bond with a composite fabric backing, said fabric backing consisting of an intermediate layer of non-elastic open mesh woven fabric and an outer layer of knitted textile fabric attached to one surface of said latex layer by penetration of the latex through the open mesh fabric and into the interstices of the outer fabric layer.

5. A new article of manufacture comprising a vulcanized layer of foamed and gelled rubber latex having a vulcanized bond with a composite fabric backing, said fabric backing consisting of an intermediate layer of non-elastic open mesh woven fabric having square openings each at least substantially four times as large as the diameter of the yarn from which the fabric is woven, and an outer layer of knitted textile fabric attached to one surface of said latex by penetration of the latex through the open mesh fabric and into the interstices of the outer fabric layer.

6. In the method of making a sponge rubber product having a non-elastic composite fabric backing, the steps of depositing a mass of liquid rubber latex on a moving belt in front of a doctor bar spaced above the belt, passing a strip of non-elastic open mesh woven fabric under the doctor bar in contact with the latex causing penetration of the latex through the woven fabric, and applying a strip of knitted textile fabric to the upper surface of said woven fabric in contact with the latex penetrating through said woven fabric.

7. In the method of making a sponge rubber product having a non-elastic composite fabric backing, the steps of depositing a mass of liquid rubber latex on a moving belt in front of a doctor bar spaced above the belt, passing a strip of non-elastic open mesh woven fabric under the doctor bar in contact with the latex causing penetration of the latex through the woven fabric, and simultaneously passing a strip of knitted textile fabric under the doctor bar in contact with the woven fabric and the liquid latex penetrating therethrough.

8. In the method of making a sponge rubber product having a non-elastic composite fabric backing, the steps of depositing a mass of liquid rubber latex on a moving belt in front of a doctor bar spaced above the belt, passing a strip of non-elastic open mesh woven fabric under the doctor bar in contact with the latex causing penetration of the latex through the woven fabric, and then passing a strip of knitted textile fabric under a second doctor bar in contact with the upper surface of the woven fabric and the liquid latex penetrating therethrough.

9. In a method of making a sponge rubber product having a non-elastic composite fabric backing, the steps of depositing a mass of liquid rubber latex between a supporting surface and a layer of non-elastic open mesh woven fabric, bringing said liquid mass to a uniform thickness while held between said surface and said fabric layer, and then applying a layer of knitted textile fabric to the outer surface of said woven fabric in contact with the latex penetrating through the woven fabric.

STERLING W. ALDERFER.

No references cited.